United States Patent
Aibara

(10) Patent No.: US 11,989,812 B2
(45) Date of Patent: May 21, 2024

(54) INFORMATION PROCESSING DEVICE ESTIMATING A PARAMETER BASED ON ACQUIRED INDEXES REPRESENTING AN EXERCISE STATE OF A SUBJECT, INFORMATION PROCESSING METHOD, AND NON-TRANSITORY RECORDING MEDIUM

(71) Applicant: CASIO COMPUTER CO., LTD., Tokyo (JP)

(72) Inventor: Takehiro Aibara, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 88 days.

(21) Appl. No.: 17/947,217

(22) Filed: Sep. 19, 2022

(65) Prior Publication Data

US 2023/0019283 A1    Jan. 19, 2023

Related U.S. Application Data

(63) Continuation of application No. 17/468,694, filed on Sep. 8, 2021, now Pat. No. 11,481,947.

(30) Foreign Application Priority Data

Sep. 23, 2020   (JP) ................................. 2020-158085

(51) Int. Cl.
*G06T 13/40*      (2011.01)
*A63B 24/00*      (2006.01)

(52) U.S. Cl.
CPC .......... *G06T 13/40* (2013.01); *A63B 24/0006* (2013.01); *A63B 24/0062* (2013.01)

(58) Field of Classification Search
None
See application file for complete search history.

(56) References Cited

U.S. PATENT DOCUMENTS

2016/0232698 A1*   8/2016   Kim .................... G06V 40/103

FOREIGN PATENT DOCUMENTS

JP       2018026149 A      2/2018

OTHER PUBLICATIONS

Office Action (Ex Parte Quayle) dated Apr. 27, 2022, issued in parent U.S. Appl. No. 17/468,694.
Notice of Allowance dated Jun. 20, 2022, issued in parent U.S. Appl. No. 17/468,694.

* cited by examiner

*Primary Examiner* — Robert J Craddock
(74) *Attorney, Agent, or Firm* — Holtz, Holtz & Volek PC

(57) ABSTRACT

An information processing device including a memory that stores a program; and a processor that executes the program. The processor is configured to acquire, from exercise data representing an exercise state of a subject, exercise parameter information including a plurality of parameters that represent the exercise state of the subject and have a correlation with each other. When an animation representing a motion of the subject based on the acquired exercise parameter information is displayed and then an operation for changing a value of a first parameter of the plurality of parameters is received, the processor generates an animation reflecting at least the first parameter for which the value is changed and a second parameter of the plurality of parameters, a value of the second parameter being changed in conjunction with the value of the first parameter.

12 Claims, 9 Drawing Sheets

EXERCISE STATE STORAGE DB 222

| USER ID | SPEED (m/s) | PITCH (step/m) | VERTICAL MOVEMENT (cm) | MEASUREMENT DATE AND TIME |
|---|---|---|---|---|
| U0001 | 5.5 | 153 | 8.5 | 2020.08.01-10:00 |
| U0001 | 6.0 | 162 | 8.4 | 2020.08.01-10:05 |
| U0002 | 7.5 | 176 | 6.0 | 2020.08.01-11:30 |
| U0002 | 7.3 | 170 | 6.2 | 2020.08.01-11:35 |
| : | : | : | : | : |

INFORMATION PROCESSING DEVICE ESTIMATING A PARAMETER BASED ON ACQUIRED INDEXES REPRESENTING AN EXERCISE STATE OF A SUBJECT, INFORMATION PROCESSING METHOD, AND NON-TRANSITORY RECORDING MEDIUM

CROSS-REFERENCE TO RELATED APPLICATION

This application is a Continuation Application of U.S. application Ser. No. 17/468,694, filed Sep. 8, 2021, which claims the benefit of Japanese Patent Application No. 2020-158085, filed on Sep. 23, 2020, the entire disclosure of all of which is incorporated by reference herein.

FIELD

This application relates generally to an information processing device, an information processing method, and a non-transitory recording medium.

BACKGROUND

In the related art, technology is known in which a wearable device, a motion sensor, or the like worn on the body of a user is used to measure various indexes (parameters) that represent the exercise state of the user. For example, Japanese Unexamined Patent Application Publication No. 2018-026149 describes an invention that displays an animation that represents the movement of a user on the basis of various acquired indexes that represent an exercise state. In the invention described in the Japanese Unexamined Patent Application Publication No. 2018-026149, when the user manually changes the value of an index, the animation can be changed in accordance with the changed value.

SUMMARY

An information processing device according to the present disclosure includes:
at least one processor that executes a program stored in at least one memory; wherein
the at least one processor is configured to
acquire, as indexes representing an exercise state of a certain subject, a value of a first parameter, and a value of a second parameter that is an index that differs from and has correlation with the first parameter,
acquire another first parameter that is the first parameter having a value that differs from the acquired value of the first parameter,
derive, based on the acquired first parameter, a first reference value as the second parameter in accordance with a model generated based on sets of a value of a third parameter as an input of the model and a value of a fourth parameter as an output of the model, the third parameter being a same type as the first parameter, the fourth parameter being a same type as the second parameter, the value of the third parameter and the value of the fourth parameter representing an exercise state of each of a plurality of subjects that is a same type as the certain subject,
derive, based on the acquired another first parameter, a second reference value as the second parameter in accordance with the model, and estimate, based on the acquired value of the second parameter, the first reference value, and the second reference value, the value of the second parameter that corresponds to the another first parameter.

BRIEF DESCRIPTION OF THE DRAWINGS

A more complete understanding of this application can be obtained when the following detailed description is considered in conjunction with the following drawings, in which.

DETAILED DESCRIPTION

Figure 1:
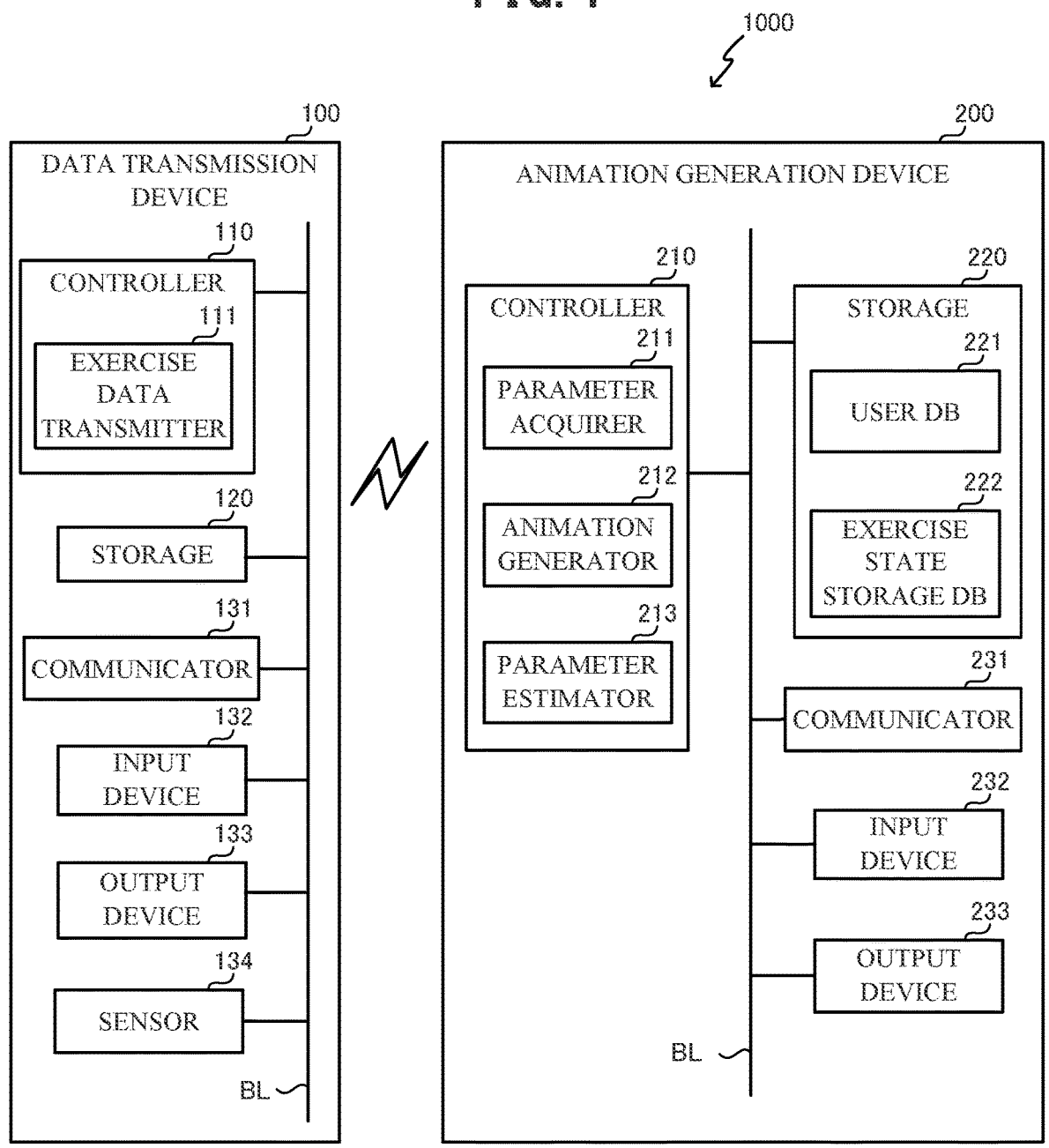
FIG. 1 is a drawing illustrating the configuration of an animation generation system according to an embodiment.

Hereinafter, embodiments of the present disclosure are described in detail while referencing the drawings. Note that, in the drawings, identical or corresponding components are denoted with the same reference numerals.

Embodiments

An animation generation system 1000 according to an embodiment of the present disclosure is a system that generates an animation representing a motion (form) of a user (subject) that is performing movement/exercise such as running or the like. As illustrated in FIG. 1, the animation generation system 1000 includes a data transmission device 100, and an animation generation device 200. Note that, in reality, a plurality of the data transmission device 100 is provided for each subject.

In one example, the data transmission device 100 is a small wearable device that is worn near the waist, along the trunk of the subject. As illustrated in FIG. 1, the data transmission device 100 includes a controller 110, a storage 120, a communicator 131, an input device 132, an output device 133, and a sensor 134. The controller 110, the storage 120, the communicator 131, the input device 132, the output device 133, and the sensor 134 are connected to each other via a bus line BL. The data transmission device 100 sends, to the animation generation device 200 via the communicator 131, data expressing the motion of the subject detected by the sensor 134.

The controller 110 includes at least one processor. Examples of the at least one processor include a central processing unit (CPU) or the like. By executing a program stored in the storage 120, the controller 110 functions as an exercise data transmitter 111 (described later).

The storage 120 includes at least one memory. Examples of the at least one memory include a read-only memory (ROM), a random access memory (RAM), a flash memory, or the like. The storage 120 stores programs to be executed by the CPU of the controller 110 and necessary data. Note that data that is to be retained even after the power of the data transmission device 100 is turned OFF is stored in non-volatile memory such as flash memory or the like.

The communicator 131 includes a wireless communication module and an antenna, and carries out data communication wirelessly with the animation generation device 200. The data communication between the communicator 131 and the animation generation device 200 is not limited to a wireless method. For example, the data communication may be carried out using a wired interface such as a universal serial bus (USB) or the like.

The input device 132 includes a press button switch or the like. In one example, the input device 132 receives input instructions such as "start measurement", "transmit data", and the like from the subject.

The output device 133 includes a light emitting diode (LED), a liquid crystal display panel, an organic electroluminescence (EL) display panel, or the like, and displays the operating state (power ON, measuring, transmitting data, and the like) of the data transmission device 100. Additionally, the output device 133 includes an audio output device such as a speaker or the like, and outputs, as audio information, information expressing the operating state or the like of the data transmission device 100.

The sensor 134 includes an acceleration sensor, a gyro (angular velocity) sensor, a global positioning system (GPS) receiver, and the like. The sensor 134 detects the motion of the subject wearing the data transmission device 100, the current position of the subject, and the like. The sensor 134 sends, to the controller 110, acceleration data detected by the acceleration sensor, angular velocity data detected by the gyro sensor, time data and position data received by the GPS receiver, and the like. These pieces of data that the sensor 134 sends to the controller 110 are pieces of data for representing the exercise state of the subject wearing the data transmission device 100 and, as such, are collectively referred to hereinafter as "exercise data." Note that the data transmission device 100 (the sensor 134) may be worn on a part of the subject other than the waist (for example, on a wrist or an ankle). Additionally, the data transmission device 100 may include a plurality of the sensor 134 such as, for example, a sensor 134 worn on the waist, a sensor 134 worn on the wrist, a sensor 134 worn on the ankle, or the like of the subject.

Next, the functions of the controller 110 are described. By executing a program stored in the storage 120, the controller 110 functions as an exercise data transmitter 111.

The exercise data transmitter 111 sends, via the communicator 131 to the animation generation device 200, the exercise data detected by the sensor 134 (the acceleration data, the angular velocity data, the time data, the position data, and the like that represents the motion of the subject). The exercise data transmitter 111 may also send, as the exercise data to the animation generation device 200, movement distance data calculated from the position data, speed data calculated from the time data and the position data, acceleration data, and the like.

Next, the animation generation device 200 is described. In one example, the animation generation device 200 is a terminal device such as a personal computer (PC), a smartphone, a tablet, or the like. As illustrated in FIG. 1, the animation generation device 200 includes a controller 210, a storage 220, a communicator 231, an input device 232, and an output device 233. The controller 210, the storage 220, the communicator 231, the input device 232, and the output device 233 are connected to each other via a bus line BL. The animation generation device 200 calculates, from the exercise data sent by the data transmission device 100, values of a plurality of different types of parameters as indexes that represent the exercise state of running, generates an animation representing the motion of running of the subject, and presents the generated animation to the subject.

The controller 210 includes a CPU or the like. By executing a program stored in the storage 220, the controller 210 functions as various constituents that are described later (a parameter acquirer 211, an animation generator 212, and a parameter estimator 213).

The storage 220 includes a ROM, a RAM, a flash memory, or the like. The storage 220 stores programs to be executed by the CPU of the controller 210 and necessary data. Note that data that is to be retained even after the power of the animation generation device 200 is turned OFF is stored in non-volatile memory such as flash memory or the like. Additionally, the storage 220 stores a user database (DB) 221 and an exercise state storage DB 222.

The user DB 221 is a database in which information related to the subject of the data transmission device 100 is registered. Specifically, information expressing a user ID that uniquely identifies the subject, a name, a gender, a physique (height, weight, and the like), running history, a best time, and the like is stored in the user DB 221 for each subject of the data transmission device 100.

Figures 2, 3:
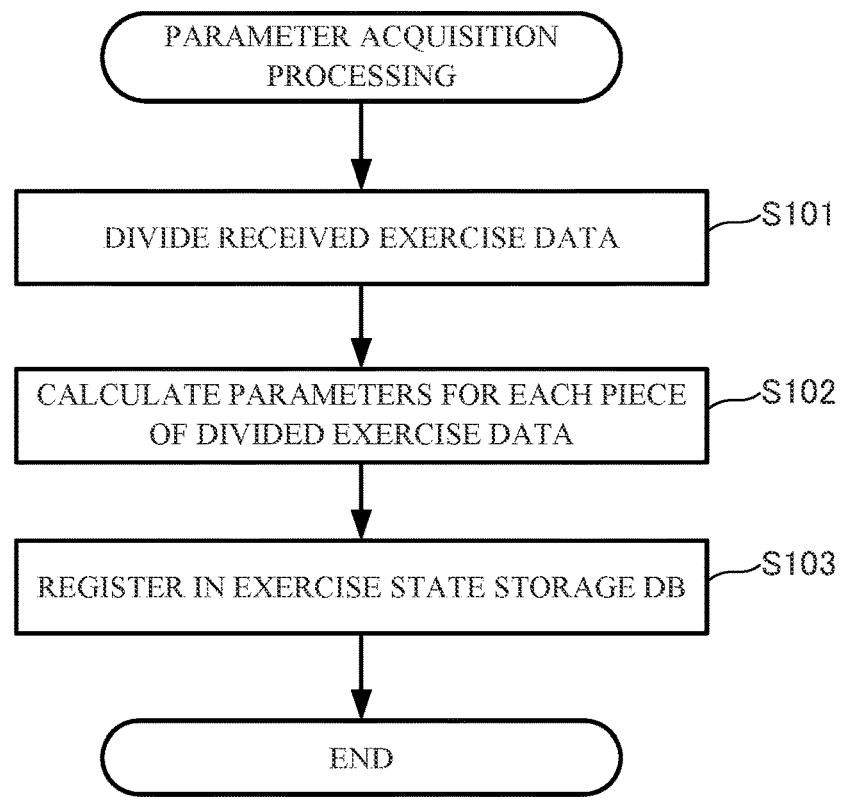
FIG. 2 is a drawing illustrating an example of information stored in an exercise state storage database.
FIG. 3 is a flowchart of parameter acquisition processing according to an embodiment.

The exercise state storage DB 222 is a database in which a plurality of parameters representing the exercise state of running of the subject measured to-date is stored. Specifically, as illustrated in FIG. 2, a plurality of exercise parameter information in which the user ID of the subject; as the parameters representing the exercise state of the subject, various values of the speed, the pitch (steps per unit time), and the vertical movement of the movement/exercise of the subject; and information indicating a measurement date and time at which these parameters are measured are associated is stored in the exercise state storage DB 222. Note that it is empirically known that the various values of the speed, the pitch, and the vertical movement that are the parameters representing the exercise state of the user have correlation with each other and change in conjunction with each other due to changes in the exercise state of the subject. For example, when the speed of the subject changes, the pitch and the vertical movement change in conjunction.

The communicator 231 includes a wireless communication module, an antenna, and the like, and carries out data communication wirelessly with the data transmission device 100. The data communication between the communicator 231 and the data transmission device 100 is not limited to a wireless method. For example, the data communication may be carried out using a wired interface such as USB or the like.

The input device 232 includes a switch, a touch panel, a keyboard, a mouse, or the like. In one example, the input device 232 receives input instructions such as "generate animation", "change parameters", and the like from the subject.

The output device 233 includes a liquid crystal display panel, an organic EL display panel, or the like. In one example, the output device 233 displays an animation generated in animation generation processing (described later), displays a screen for changing the parameters, and the like. Additionally, the output device 233 may include an audio output device such as a speaker or the like, and may output audio related to the animation generated by the animation generation processing or the like.

Next, the functions of the controller 210 are described. By executing a program stored in the storage 220, the controller 210 functions a parameter acquirer 211, an animation generator 212, and a parameter estimator 213.

The parameter acquirer 211 acquires, via the communicator 231, the exercise data (the acceleration data, the angular velocity data, the time data, the position data, the distance data, the speed data, and the like) indicating the motion of the subject acquired from the data transmission device 100. Moreover, the parameter acquirer 211 calculates, from the acquired exercise data, a plurality of parameters (the speed, the pitch, and the vertical movement) that have correlation and that represent the exercise state of running of the subject, and registers the calculated plurality of parameters in the exercise state storage DB 222.

Note that the parameter acquirer 211 can use a known method to calculate the various parameters from the exercise data. For example, the parameter acquirer 211 can use the method described in Japanese Patent No. 6648439, the method described in Japanese Unexamined Patent Application Publication No. 2019-216798, or the like.

For example, the parameter acquirer 211 can calculate the speed from time changes in the position data indicated by the exercise data. Additionally, the parameter acquirer 211 can obtain the waveform period (running period) of a vertical direction component of the acceleration indicated by the exercise data, and calculate the pitch from the from the running period. Moreover, the parameter acquirer 211 can integrate the vertical direction component of the acceleration indicated by the exercise data to calculate the vertical movement as the difference between the highest point and the lowest point of the position (the position of the waist of the subject where the data transmission device 100 is worn) from when one foot contacts the ground to when the other foot contacts the ground.

The animation generator 212 generates an animation representing the corresponding motion of the subject on the basis of various values of the plurality of parameters specified as parameters to be animated.

When one value of the plurality of parameters specified as parameters to be animated changes, the parameter estimator 213 generates, on the basis of the plurality of exercise parameter information stored in the exercise state storage DB 222, a model that defines the relationships among the values of the plurality of parameters, and estimates the values of the parameters that are expected to change in conjunction.

Next, the processing executed by the animation generation device 200 is described. Firstly, parameter acquisition processing executed by the animation generation device 200 is described. The subject of the data transmission device 100 wears the data transmission device 100, inputs an instruction of "start exercise data measurement" via the input device 132 and, then, performs running or waking, for example, as exercise. As a result, the sensor 134 of the data transmission device 100 continuously measures, every predetermined amount of time (for example, every one second) the exercise data of the subject that is running or walking. Thereafter, the subject that has finished running inputs an instruction of "stop exercise data measurement" via the input device 132. As a result, the exercise data transmitter 111 sends the continuously measured exercise data and the user ID of the subject to the animation generation device 200. When the exercise data is received from the data transmission device 100, the parameter acquirer 211 of the animation generation device 200 executes the parameter acquisition processing illustrated in FIG. 3.

Firstly, the parameter acquirer 211 divides the received exercise data every predetermined measurement time (for example, five minutes) (step S101). For example, when the predetermined measurement time is five minutes and the received exercise data is exercise data of one hour, the exercise data is divided into 12 pieces in step S101. Note that the parameter acquirer 211 may determine a timing at which the speed changes greater than or equal to a certain threshold from the transition of the speed of the subject indicated by the received exercise data, and divide the exercise data at that timing.

Next, the parameter acquirer 211 calculates, from the exercise data and for each piece of the exercise data divided in step S101, values of the various parameters (the speed, the pitch, the vertical movement, and the like) that represent the exercise state of the subject (step S102).

Next, the parameter acquirer 211 registers, in the exercise state storage DB 222, the exercise parameter information that includes the calculated various parameters (step S103). For example, when the exercise data is divided into 12 pieces in step S101, twelve pieces of exercise parameter information are registered in the exercise state storage DB 222. Note that the user ID included in the exercise parameter information is set to the user ID received together with the exercise data. Then, the parameter acquisition processing is ended.

Note that, in the parameter acquisition processing described above, the animation generation device 200 calculates the various parameters on the basis of the exercise data received from the data transmission device 100. However, a configuration is possible in which the data transmission device 100 calculates the various parameters on the basis of the exercise data acquired by the sensor 134, and sends the calculated various parameters to the animation generation device 200.

Figure 4:
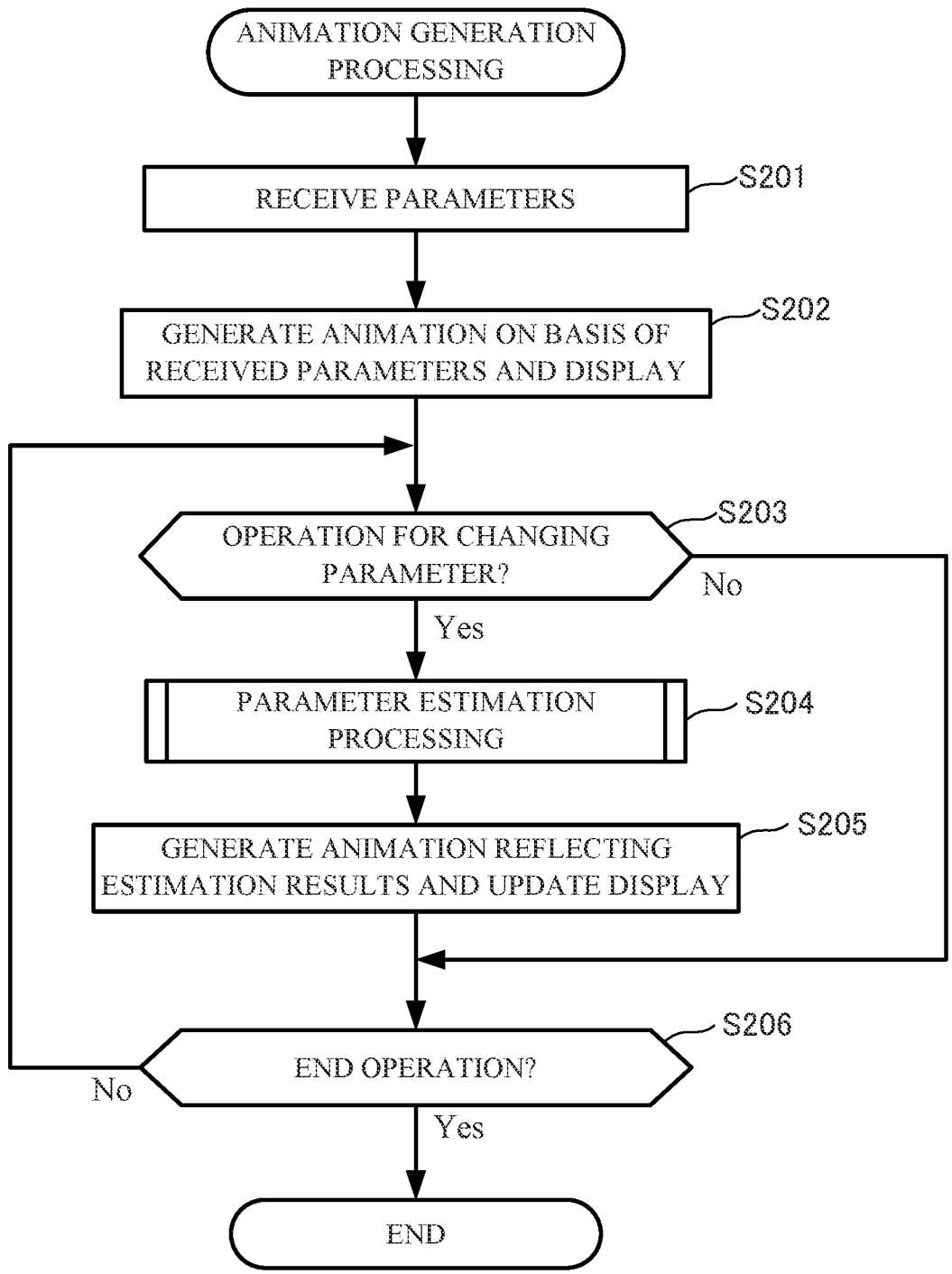
FIG. 4 is a flowchart of animation generation processing according to an embodiment.

Next, animation generation processing executed by the animation generation device 200 is described. In this case, it is assumed that, prior to the animation generation processing, the parameter acquisition processing described above is executed for a plurality of subjects, and that a sufficient number of pieces of the exercise parameter information (for example, 100 pieces or more) is stored in the exercise state storage DB 222. When the subject inputs an instruction of "generate animation" via the input device 232 of the animation generation device 200, the animation generator 212 starts the animation generation processing illustrated in FIG. 4.

Firstly, the animation generator 212 receives, from the subject, values of the various parameters (the speed, the pitch, and the vertical movement) to be animated (step S201). For example, the animation generator 212 receives, from the subject and via the input device 232, a selection of the exercise parameter information stored in the exercise state storage DB 222, and receives the values of the various parameters included in the selected exercise parameter information as the parameters to be animated. Note that a configuration is possible in which the animation generation device 200 receives the values of the various parameters that are input directly by the subject via the input device 232.

Figure 5:
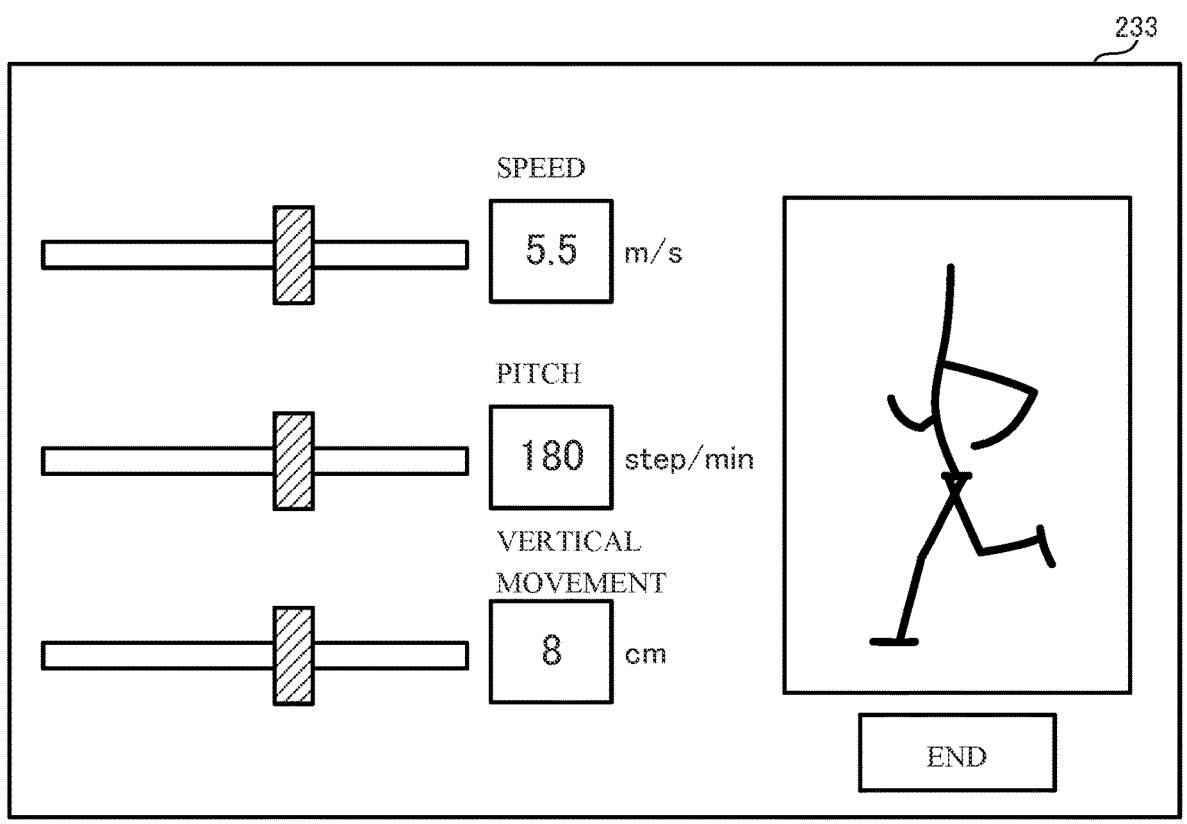
FIG. 5 is a drawing illustrating an example of a screen on which a generated animation is displayed.

Next, the animation generator 212 creates, on the basis of the received values of the various parameters, an animation that represents the exercise state of running of the subject, and displays the created animation on the output device 233 as illustrated in FIG. 5 (step S202). On this screen, the created animation is displayed on the right side, and the values of the various parameters (the speed, the pitch, and the vertical movement) on which the animation is based and slide bars for changing the value of each of the various parameters are displayed on the left side.

Returning to FIG. 4, when the subject desires to change one of the parameters on which the displayed animation is based, the subject moves, via the input device 232, the slide bar beside the parameter to be changed left or right to a position that corresponds to the amount of desired change. When an operation for changing a parameter is received (step S203; Yes), the parameter estimator 213 executes parameter estimation processing for estimating the values of the other parameters that change in conjunction with the changed parameter (step S204).

Figure 6:
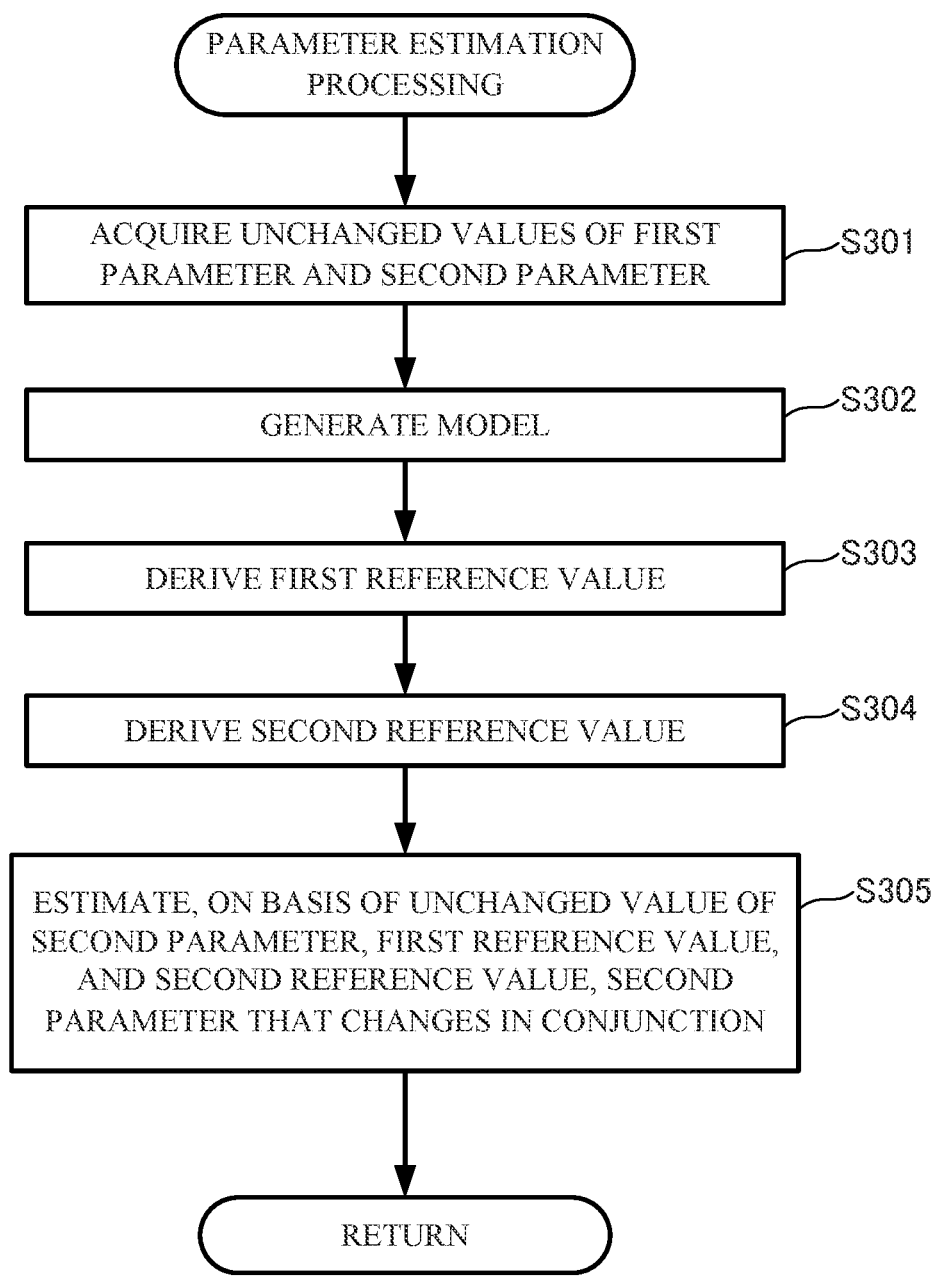
FIG. 6 is a flowchart of parameter estimation processing according to an embodiment.

The parameter estimation processing is described in detail while referencing FIG. 6. Note that, in the following description, the parameter for which the value is changed by an operation of the subject is defined as a first parameter, and another parameter for which the value is estimated to change in conjunction with the first parameter is defined as a second parameter. For example, when the subject performs, via the input device 232, an operation from the screen illustrated in FIG. 5 for changing the speed, the speed is the first parameter and the pitch or the vertical movement is the second parameter.

When the parameter estimation processing starts, the parameter estimator 213 acquires the value of the first parameter and the value of the second parameter from before the change being performed by the operation of the subject (step S301).

Next, the parameter estimator 213 generates a model in which a third parameter is the input and a fourth parameter is the output (step S302). Here, the model is generated on the basis of all sets of the value of the third parameter, that is the same type as the first parameter, and the value of the fourth parameter, that is the same type as the second parameter, expressed by each piece of the plurality of exercise parameter information stored in the exercise state storage DB 222. In one example, this model corresponds to a function (regression equation) of a regression curve created by the least-square method. Note that a configuration is possible in which the parameter estimator 213 further calculates, as the model, a reliability interval expressing a range of the value of the fourth parameter that includes a certain percentage or greater (for example, 60% or greater) of all of the sets of the third parameter and the fourth parameter.

Figure 7:
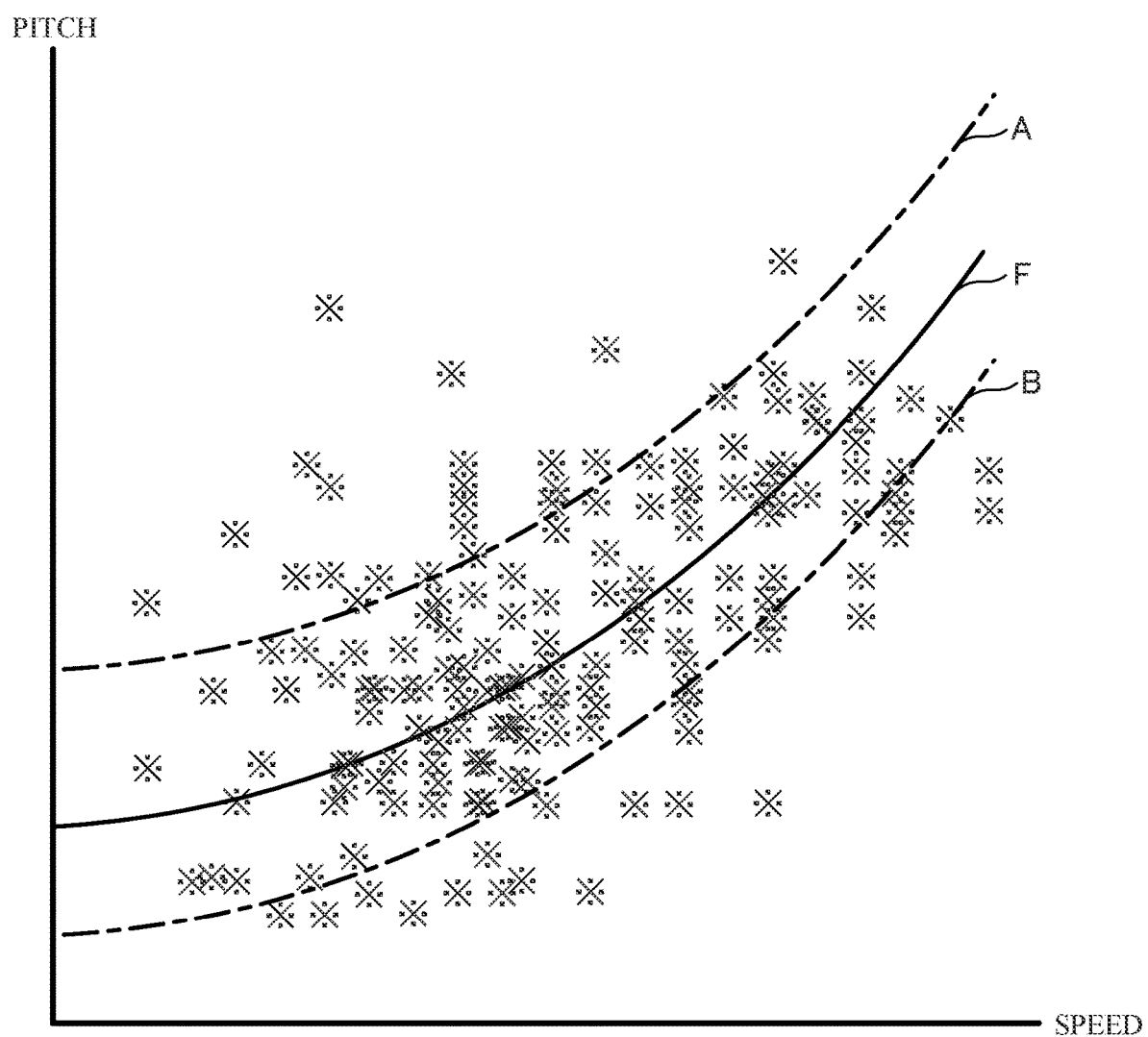
FIG. 7 is a drawing illustrating a distribution of sets of acquired values of speed and pitch, and a model generated from the distribution.

For example, FIG. 7 illustrates a distribution of the sets of the third parameter, namely speed, and the fourth parameter, namely pitch, expressed by each piece of the plurality of exercise parameter information stored in the exercise state storage DB 222. In FIG. 7, each ":✗:" symbol corresponds to a set of the speed and the pitch included in one piece of the exercise parameter information. In step S302, a model in which the speed is the input and the pitch is the output is created from this distribution by the least-square method. The solid line curve F in FIG. 7 is a regression curve corresponding to the model created from this distribution. The two dashed line curves A and B respectively indicate the upper limit and the lower limit of the reliability interval. 60% of the sets of the speed and the pitch denoted by the ":✗:" symbol are included in the range between the dashed line curves A and B. Note that the curves A and B that define the reliability interval are calculated by a known method on the basis of the relationship between the curve F and the distribution of the sets of the speed and the pitch.

Returning to FIG. 6, next, the parameter estimator 213 inputs, into the created model, the value of the first parameter, from before the value is changed, acquired in step S301, and derives a first reference value that is a value of the second parameter (step S303).

Next, the parameter estimator 213 inputs, into the created model, the value of the first parameter from after the value is changed by the operation of the subject, and derives a second reference value that is a value of the second parameter (step S304).

Next, the parameter estimator 213 estimates, on the basis of the value of the unchanged second parameter acquired in step S301, the first reference value, and the second reference value, a value of the second parameter that changes in conjunction with the changed first parameter (step S305). Then, the parameter estimation processing is ended.

Figure 8:
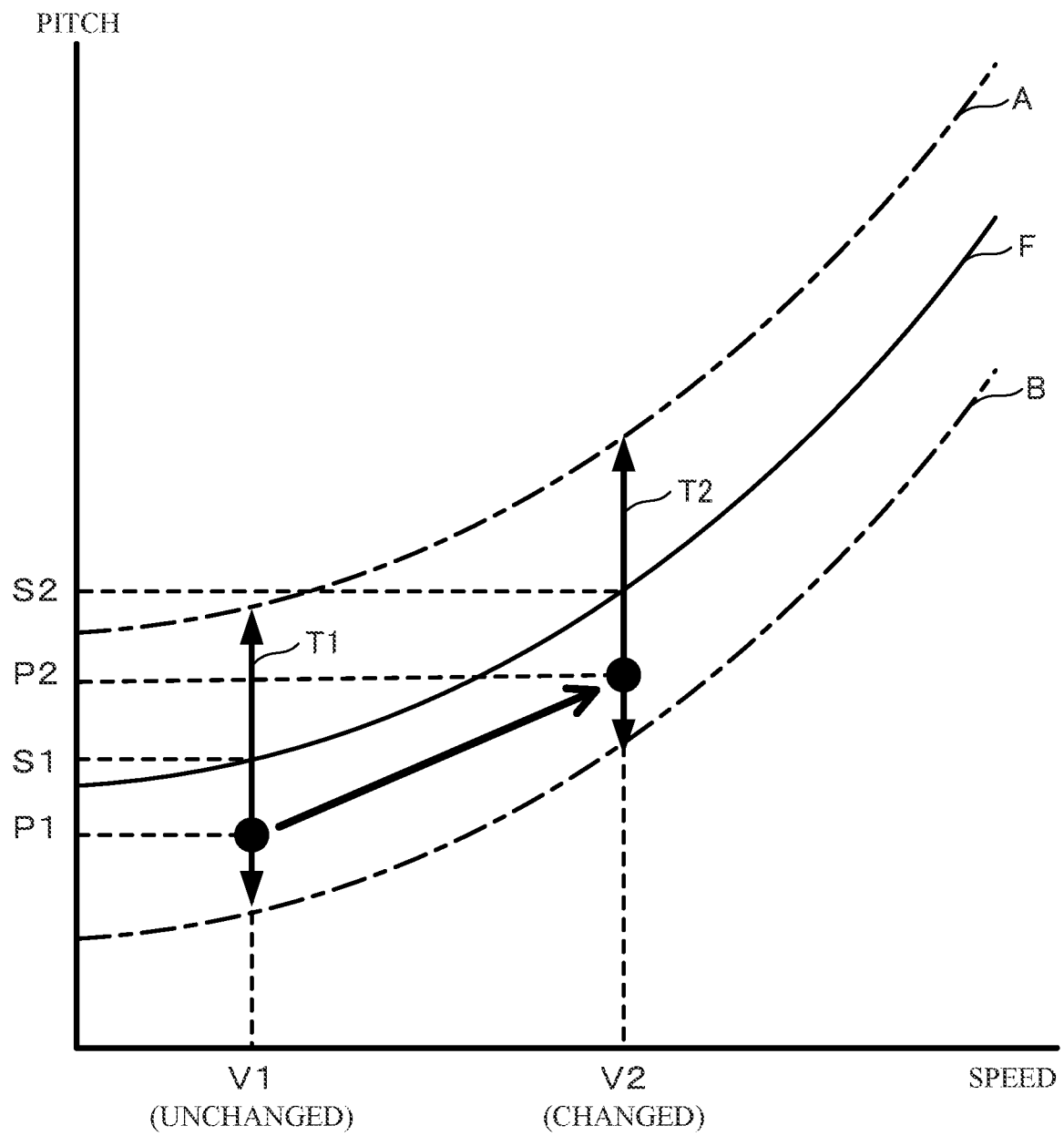
FIG. 8 is a drawing for explaining an example of estimating a parameter.

Next, an example of the processing of step S305 is described. In this case, it is assumed that the first parameter and the third parameter are speed, the second parameter and the fourth parameter are pitch, and a model such as the curve F illustrated in FIG. 8 is generated. Moreover, a case is considered in which, from a state in which the value of the speed is V1 and the value of the pitch is P1, the subject performs an operation for only changing the value of the speed to V2. In this case, the parameter estimator 213 estimates that the value of the pitch changes so as to conform to the curve F. That is, the parameter estimator 213 estimates, on the basis of the following equation, the value P2 of the pitch that is the second parameter that changes in conjunction with the first parameter.

$$P2=S2+K*(P1-S1)$$

As illustrated in FIG. 8, in this equation, P1 represents the value of the pitch corresponding to the speed V1 prior to the speed being changed to V2, S1 represents the first reference value, and S2 represents the second reference value. Additionally, in this equation, K is a coefficient set as desired in a range of 0 to 1. Note that K is typically set to 1.0. When it is desired to bring P2, which is the estimated value of the changed second parameter, close to the second reference value S2, K is set to a value near 0.0.

Note that, when the reliability interval is also calculated as the model, the parameter estimator 213 may estimate P2 while considering the ratio (T2/T1) of the lengths of the reliability interval as illustrated in the following equation.

$$P2=S2+K*(P1-S1)*T2/T1$$

As illustrated in FIG. 8, in this equation, T1 represents the length of the reliability interval at the unchanged speed V1. T2 represents the length of the reliability interval at the changed speed V2. In one example, the equation of the curve A is expressed as a(v) and the equation of the curve B is expressed as b(v) as functions of the speed v. In this case, it is sufficient to calculate T1 and T2 on the basis of the following equations.

$$T1=a(V1)-b(V1)$$

$$T2=a(V2)-b(V2)$$

Here, an example is given in which the second parameter, namely pitch, is estimated when the first parameter, namely speed, is changed. However, a configuration is possible in which a set consisting of other parameters for which the values have correlation are set as the first parameter and the second parameter. For example, when the first parameter and the second parameter are reversed and the first parameter, namely the pitch, is changed, it is possible to estimate the second parameter, namely speed, by the same method.

Figure 9:
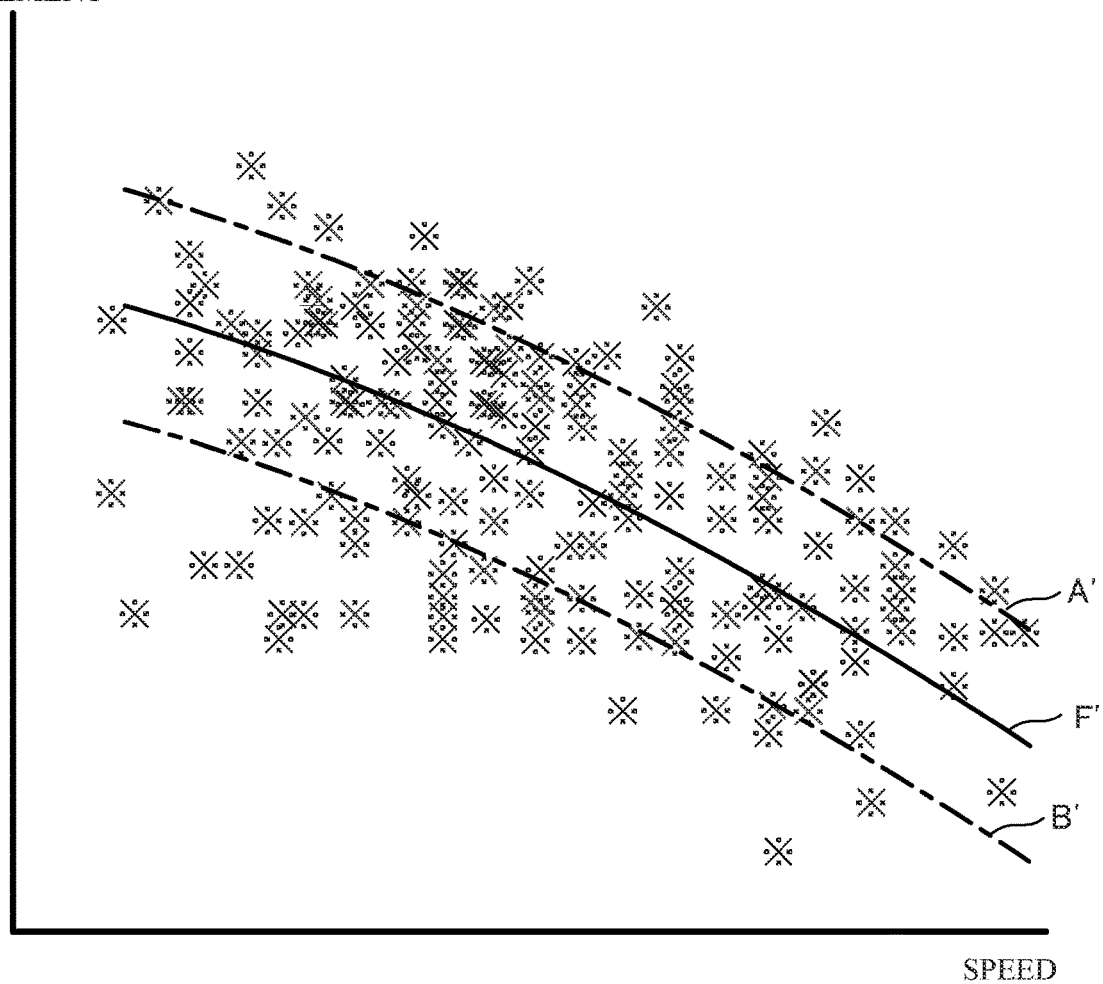
FIG. 9 is a drawing illustrating a distribution of sets of acquired values of speed and vertical movement, and a model generated from the distribution.

In another example, there is correlation between the speed and the vertical movement and, as illustrated in FIG. 9, a regression curve F' and a reliability interval (interval between a curve A' and a curve B') can be calculated as the model from the distribution of sets of the speed and the vertical movement, this model can be used to estimate, in the same manner, the second parameter, namely the vertical movement, when the first parameter, namely the speed, is changed. Alternatively, when the first parameter and the second parameter are reversed and the first parameter, namely the vertical movement, is changed, it is possible to estimate the second parameter, namely the speed, in the same manner.

Figure 10:
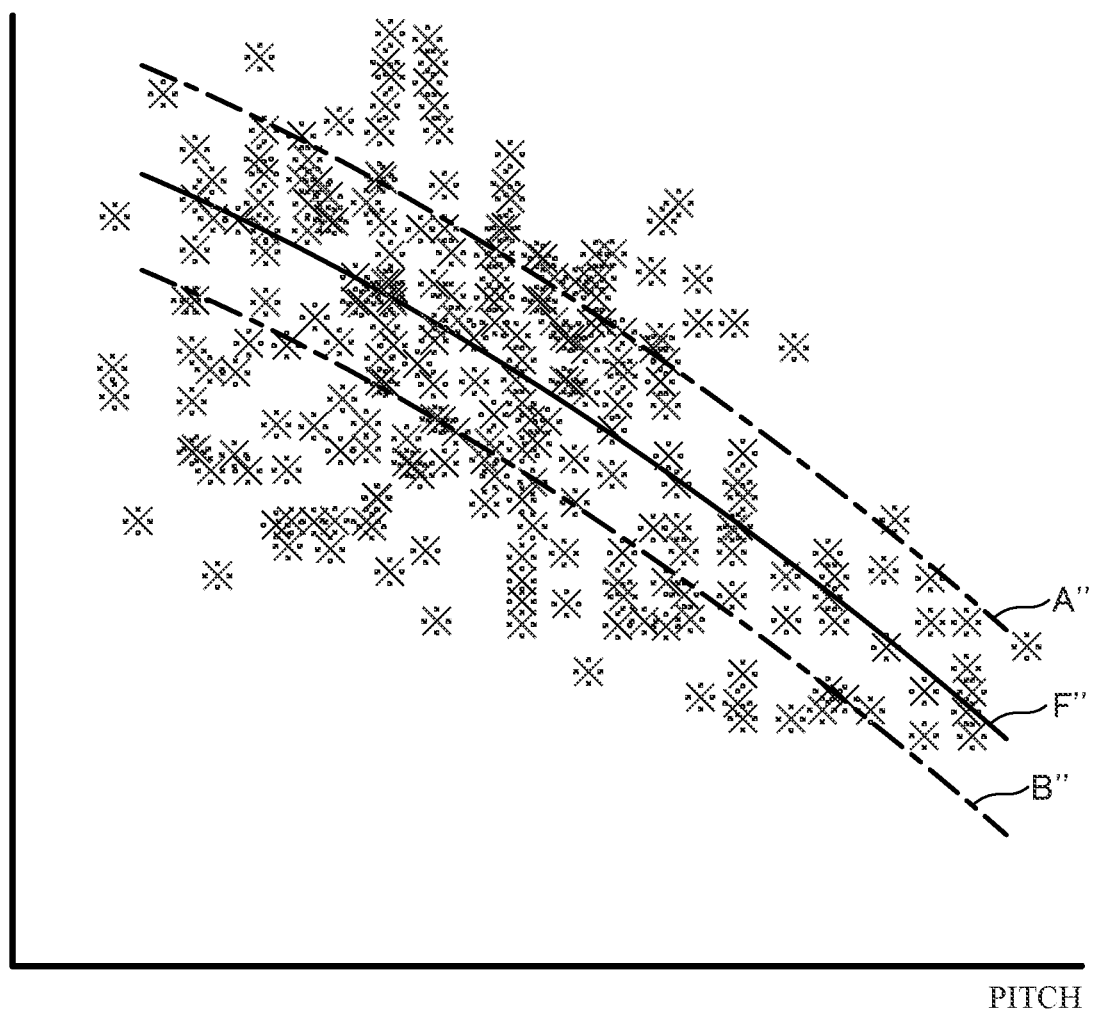
FIG. 10 is a drawing illustrating a distribution of sets of acquired values of pitch and vertical movement, and a model generated from the distribution.

In another example, there is correlation between the pitch and the vertical movement and, as illustrated in FIG. 10, a regression curve F" and a reliability interval (interval between a curve A" and a curve B") can be calculated as the model from the distribution of sets of the pitch and the vertical movement, this model can be used to estimate, in the same manner, the second parameter, namely the vertical movement, when the first parameter, namely the pitch, is changed. Alternatively, when the first parameter and the second parameter are reversed and the first parameter, namely the vertical movement, is changed, it is possible to estimate the second parameter, namely the pitch, in the same manner.

Returning to FIG. 4, when the parameter estimation processing (step S204) ends, the animation generator 212 creates an animation that reflects the estimation results and updates the display (step S205). In one example, it is assumed that the value of the speed us changed by an operation of the subject and, in the parameter estimation processing, the values of the pitch and the vertical movement that change in conjunction with the value of the speed are estimated. In this case, the animation generator 212 changes the values of the parameters and the positions of the slider bars on the left side of the screen illustrated in FIG. 5 so as to become the value of the speed changed by the subject, and the value of the pitch and the value of the vertical movement estimated in the parameter estimation processing; creates an animation on the basis of these various values; and updates the animation displayed on the right side.

After the updating of the display in step S205 is ended or, when an operation for changing a parameter is not received from the subject (step S203; No), the animation generator 212 determines whether an instruction to end the animation generation processing (for example, a click of the button "end" in the screen illustrated in FIG. 5) is received from the subject via the input device 232 (step S206). When the instruction to end is not received (step S206; No), the processing of step S203 is executed. However, when the instruction to end is received (step S206; Yes), the animation generation processing is ended.

Thus, according to the present embodiment, a model (regression line) in which one parameter (for example, the speed) is the input and another parameter (for example, the pitch) is the output is generated from sets of parameters (for example, sets of the speed and the pitch), stored in the exercise state storage DB 222, that represent the exercise states of a plurality of subjects. Moreover, when the acquired value of one parameter is changed, the manner in which the value of the other parameter changes is estimated on the basis of the generated model. That is, according to the present embodiment, when one of the plurality of parameters representing the exercise state changes or is assumed to change, it is possible to estimate how the value of the other parameter will change.

Additionally, according to the present embodiment, when the subject performs an operation or the like to change the value of one parameter of the plurality of parameters that represent the exercise state, the manner in which the value of the other parameter will change in conjunction with the change of the value of the one parameter is estimated, and an animation representing the exercise state is created on the basis of the estimated value of the parameter. As such, natural animations can be created even when only the value of one parameter changes.

Additionally, in the present embodiment, it is possible to calculate a reliability interval in addition to the regression line as the model for estimating the parameter, and to estimate the parameter while considering the lengths of the reliability intervals. As such, it is possible to improve the accuracy of estimating parameters.

Modified Examples

Note that the present disclosure is not limited to the embodiment described above, and various modifications of portions are possible without departing from the spirit and scope of the present disclosure.

For example, in the embodiment described above, in the parameter estimation processing, the model is created from all of the exercise parameter information stored in the exercise state storage DB 222. However, a configuration is possible in which, the model is created from exercise parameter information that corresponds to the exercise state of a subject that has the same attributes as the subject that is to be animated. For example, in the parameter estimation processing, when estimating parameters representing the exercise state of a subject that is a female, the parameter estimator 213 may reference the user DB 221, extract, from the exercise state storage DB 222, exercise parameter information that corresponds to the exercise state of a female, and create the model from the extracted exercise parameter information.

In the embodiment described above, the speed, the pitch, and the vertical movement of the subject are described as examples of the parameters that represent the exercise state and that change in conjunction with each other. However, the parameters are not limited thereto and other parameters may be set as the first parameter and the second parameter. For example, two parameters that have correlation, selected from, the speed, the pitch, and the vertical movement and, furthermore, a stride, a stride to height ratio, a vertical movement to height ratio, a left-right movement, a forward-backward movement, a ground contact time, a swing time, a ground contact time rate, a deceleration amount, a sink amount, a sink amount to height ratio, a braking time, a ground contact impact, a kick acceleration, a kick time, an amount of pelvic rotation, a stiffness, a stiffness to weight ratio, a ground contact angle, and a kicking angle may be set as the first parameter and the second parameter. Note that, like the speed, the pitch, and the vertical movement, these parameters can be calculated by known methods from exercise data acquired by the data transmission device 100.

For example, the stride is the step width per step, and can be calculated by dividing the speed per minute by the pitch. The stride to height ratio can be calculated by dividing the stride by the height of the subject. The vertical movement to height ratio can be calculated by dividing the vertical movement by the height of the subject.

The left-right movement is a left-right fluctuation range of the position from when one foot contacts the ground to when the other foot contacts the ground, and can be calculated by integrating the left-right direction component of the acceleration indicated by the exercise data. The forward-backward movement is a forward-backward direction fluctuation range of the position from when one foot contacts the ground to when the other foot contacts the ground, and can be calculated by integrating the forward-backward direction component of the acceleration indicated by the exercise data and subtracting the movement distance at average speed.

The ground contact time is an amount of time from when one foot contacts the ground to when that foot leaves the ground, and can be calculated by identifying, on the basis of the acceleration indicated by the exercise data, the timings at which the ground is contacted and the ground is left. The swing time is an amount of time from when one foot leaves the ground to when that foot contacts the ground. The ground contact time rate can be calculated as follows:

ground contact time rate=ground contact time/ (ground contact time+swing time).

The deceleration amount can be calculated on the basis of the acceleration indicated by the exercise data, by integrating, for an amount corresponding to one cycle of one foot, the magnitude of an acceleration vector in the backward direction in a ground contact interval. The sink amount is the difference between the position at ground contact of one foot and a lowest point thereafter, and can be calculated by integrating, from the time of ground contact to the lowest point, the vertical direction component of the acceleration indicated by the exercise data. The sink amount to height ratio can be calculated by dividing the sink amount by the height of the subject.

The braking time is the amount of time from ground contact to when the forward-backward component of the acceleration changes to the propulsion direction, and can be calculated by identifying the timing of ground contact and the timing at which the forward-backward component of the acceleration indicated by the exercise data changes to the propulsion direction. The ground contact impact is the amount of impact when making ground contact, and can be expressed by the magnitudes immediately after ground contact of various components of an acceleration vector indicated by the exercise data.

The kick acceleration is the magnitude of acceleration at propulsion, and can be expressed by the magnitude of the forward-backward direction component of an acceleration vector indicated by the exercise data. The kick time is the amount of time in which acceleration in the propulsion direction is generated during a ground contact period, and can be calculated by measuring the amount of time that the forward-backward direction component of the acceleration indicated by the exercise data is generated. Alternatively, the kick time may be calculated on the basis of the vertical movement component of the acceleration indicated by the exercise data, by measuring the amount of time from the lowest point to when one foot leaves the ground.

The amount of pelvic rotation is an amount that the pelvis rotates from when one foot contacts the ground to when that foot contacts the ground (two-step cycle), or from when one foot contacts the ground to when the other foot contacts the ground (one-step cycle), and can be calculated on the basis of a rotation speed indicated by the exercise data. The stiffness is a spring constant for a case in which the feet are regarded as springs, and can be calculated on the basis of a change in the vertical movement component of the acceleration indicated by the exercise data. The stiffness to weight ratio can be calculated by dividing the stiffness by the weight of the subject.

The ground contact angle is an angle between the speed vector at ground contact and the horizontal plane or the ground surface, and the kick angle is an angle between the speed vector at ground leaving and the horizontal plane or the ground surface. The ground contact angle and the kick angle can be calculated on the basis of the various directional components of the acceleration indicated by the exercise data.

In the embodiment described above, in the parameter estimation processing, the first reference value and the second reference value are derived by inputting the value of the first parameter into the created model, namely a regression equation. However, the method for deriving the first reference value and the second reference value from the model is not limited thereto. For example, a configuration is possible in which the first reference value and the second reference value are derived by inputting, into the model, a value obtained by multiplying the value of the first parameter by a certain coefficient.

In the embodiment described above, it is described that the animation generation device 200 creates an animation that represents the exercise state of running of the subject. However, the exercise state is not limited to running. The present disclosure can be also be applied to an animation generation device that creates an animation of a baseball pitching form, or the like, for example.

In the embodiment described above, an example is described of an animation generation device 200 that creates an animation that represents the exercise state of a subject that is a human. However, the subject of the animation to be created is not limited to a human, and the present disclosure can be applied to an animation generation device 200 that creates an animation that represents the exercise state of a subject other than a human. For example, the present disclosure can be also be applied to an animation generation device that generates an animation that represents a running state of a race horse, an operating state of a robot, or the like.

The present disclosure is not limited to the animation generation device 200. For example, the present disclosure can be also be applied to an information processing device that executes only the parameter estimation processing without creating an animation, or the like.

In the embodiment described above, in the parameter estimation processing, the animation generation device 200 generates a model for estimating a parameter. However, a configuration is possible in which a model is generated in advance by an external server or the like and, in the parameter estimation processing, the animation generation device 200 estimates the parameter on the basis of the model acquired from the external server or the like. With such a configuration, the processing for generating the model by the animation generation device 200 can be eliminated and, as a result, the load applied to the animation generation device 200 can be reduced and the processing time of the parameter estimation processing can be shortened.

The various functions of the animation generation device 200 can be implemented by a computer such as a typical personal computer (PC) or the like. Specifically, in the embodiment described above, an examples is described in which programs of the animation generation processing, performed by the animation generation device 200, are stored in advance in the ROM of the storage 220. However, a computer may be configured that is capable of realizing these various features by storing and distributing the programs on a non-transitory computer-readable recording medium such as a compact disc read-only memory (CD-ROM), a digital versatile disc (DVD), a magneto-optical disc (MO), a memory card, and universal serial bus (USB) memory, and reading out and installing these programs on the computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An information processing device comprising:
a memory that stores a program; and
a processor that executes the program, wherein
the processor is configured to
acquire, from exercise data representing an exercise state of a subject, exercise parameter information including a plurality of parameters that represent the exercise state of the subject and have a correlation with each other, and
when an animation representing a motion of the subject based on the acquired exercise parameter information is displayed and then an operation for changing a value of a first parameter of the plurality of parameters is received, generate an animation reflecting at least the first parameter for which the value is changed and a second parameter of the plurality of parameters, a value of the second parameter being changed in conjunction with the value of the first parameter.

2. The information processing device according to claim 1, wherein
the processor is further configured to
generate a model defining a relationship between the value of the first parameter and the value of the second parameter,
input, to the generated model, a value of the first parameter before receiving the operation for changing and a value of the first parameter after receiving the operation for changing,
derive, from the input values of the first parameter, respective reference values of the second parameter, and
estimate, based on the derived reference values, the value of the second parameter.

3. The information processing device according to claim 2, wherein the model generated by the processor is a regression curve created from a distribution of a plurality of sets of the value of the first parameter and the value of the second parameter by a least-square method, the sets being previously stored in the memory.

4. The information processing device according to claim 3, wherein the regression curve further includes a regression curve indicating a reliability interval.

5. The information processing device according to claim 1, further comprising:
a display, wherein
the processor is configured to display the generated animation on the display.

6. An information processing device comprising:
a memory that stores a program;
a display; and
a processor that executes the program, wherein
the processor is configured to
acquire, from operation data representing an operating state of a mobile object, a plurality of pieces of operation parameter information representing operation of the mobile object,
display, based on the plurality of pieces of operation parameter information, a first animation representing a motion of the mobile object on the display, and
when the first animation is displayed and then an operation for changing a value of a first parameter of the plurality of pieces of operation parameter information is received, display, on the display, a second animation reflecting the first parameter for which the value is changed and a second parameter for which a value is changed in conjunction with the value of the first parameter.

7. An information processing method executed by an information processing device, the method comprising:
acquiring, from exercise data representing an exercise state of a subject, exercise parameter information including a plurality of parameters that represent the exercise state of the subject and have a correlation with each other, and
when an animation representing a motion of the subject based on the acquired exercise parameter information is displayed and then an operation for changing a value of a first parameter of the plurality of parameters is received, generating an animation reflecting at least the first parameter for which the value is changed and a second parameter of the plurality of parameters, a value of the second parameter being changed in conjunction with the value of the first parameter.

8. The information processing method according to claim 7, further comprising:
generating a model defining a relationship between the value of the first parameter and the value of the second parameter,
inputting, to the generated model, a value of the first parameter before receiving the operation for changing and a value of the first parameter after receiving the operation for changing,
deriving, from the input values of the first parameter, respective reference values of the second parameter, and
estimating, based on the derived reference values, the value of the second parameter.

9. The information processing method according to claim 8, wherein the model generated by the processor is a regression curve created from a distribution of a plurality of sets of the value of the first parameter and the value of the second parameter by a least-square method, the sets being previously stored in the memory.

10. The information processing method according to claim 8, wherein the regression curve further includes a regression curve indicating a reliability interval.

11. The information processing method according to claim 7, further comprising:
displaying the generated animation on the display.

12. A non-transitory computer-readable recording medium storing a program for causing a computer to execute:

acquiring, from exercise data representing an exercise state of a subject, exercise parameter information including a plurality of parameters that represent the exercise state of the subject and have a correlation with each other, and when an animation representing a motion of the subject based on the acquired exercise parameter information is displayed and then an operation for changing a value of a first parameter of the plurality of parameters is received, generating an animation reflecting at least the first parameter for which the value is changed and a second parameter of the plurality of parameters, a value of the second parameter being changed in conjunction with the value of the first parameter.

* * * * *